(12) United States Patent
Heverley, III (10) Patent No.: US 8,560,211 B2
(45) Date of Patent: Oct. 15, 2013

(54) METHOD AND SYSTEM FOR ENGINE EMISSION CONTROL

(75) Inventor: Lawrence Hoey Heverley, III, Erie, PA (US)

(73) Assignee: General Electric Company, Schenectady, NY (US)

( * ) Notice: Subject to any disclaimer, the term of this patent is extended or adjusted under 35 U.S.C. 154(b) by 376 days.

(21) Appl. No.: 12/945,268

(22) Filed: Nov. 12, 2010

(65) Prior Publication Data
US 2012/0123662 A1    May 17, 2012

(51) Int. Cl.
| | |
|---|---|
| B60T 7/12 | (2006.01) |
| G05D 1/00 | (2006.01) |
| G06F 7/00 | (2006.01) |
| G06F 17/00 | (2006.01) |

(52) U.S. Cl.
USPC ............ 701/105; 701/103; 123/478; 123/678; 123/681

(58) Field of Classification Search
USPC ................. 123/472, 478, 678, 680, 681, 689; 701/101–105, 110
See application file for complete search history.

(56) References Cited

U.S. PATENT DOCUMENTS

| | | | | |
|---|---|---|---|---|
| 5,809,954 | A * | 9/1998 | Devine et al. | 123/90.17 |
| 6,240,896 | B1 * | 6/2001 | Ueda et al. | 123/299 |
| 6,325,050 | B1 * | 12/2001 | Gallagher et al. | 123/478 |
| 6,557,503 | B2 * | 5/2003 | Hampson | 123/48 A |
| 7,073,481 | B2 * | 7/2006 | Glenn et al. | 123/305 |
| 7,127,345 | B2 * | 10/2006 | Chen et al. | 701/105 |
| 7,213,566 | B1 * | 5/2007 | Jankovic | 123/302 |
| 7,287,521 | B2 * | 10/2007 | Yang | 123/556 |
| 7,487,750 | B2 * | 2/2009 | Leone et al. | 123/90.15 |
| 2003/0200955 | A1 * | 10/2003 | zur Loye et al. | 123/435 |
| 2003/0216855 | A1 * | 11/2003 | Liang et al. | 701/114 |
| 2003/0217732 | A1 * | 11/2003 | Kataoka et al. | 123/276 |
| 2005/0145222 | A1 * | 7/2005 | Glenn et al. | 123/501 |
| 2006/0096273 | A1 * | 5/2006 | Soliman et al. | 60/285 |
| 2008/0140297 | A1 * | 6/2008 | Neunteufl et al. | 701/103 |
| 2008/0210207 | A1 * | 9/2008 | Boyarski | 123/575 |
| 2009/0143958 | A1 * | 6/2009 | Parker et al. | 701/104 |
| 2009/0271091 | A1 * | 10/2009 | Morita | 701/103 |
| 2009/0271092 | A1 * | 10/2009 | Ashizawa | 701/103 |
| 2010/0042308 | A1 * | 2/2010 | Kobayashi et al. | 701/104 |

FOREIGN PATENT DOCUMENTS

JP        58133442 A   *   8/1983

OTHER PUBLICATIONS

Goes, et al., U.S. Appl. No. 12/632,561, filed Dec. 7, 2009.
Hall, et al., U.S. Appl. No. 12/841,764, filed Jul. 22, 2010.

* cited by examiner

*Primary Examiner* — Stephen K Cronin
*Assistant Examiner* — Joseph Dallo
(74) *Attorney, Agent, or Firm* — GE Global Patent Operation; John A. Kramer (57) ABSTRACT

Methods and systems are provided for operating an engine having a plurality of notch settings. One example method comprises, during a first notch setting, adjusting engine injection timing in a first proportion to an increasing temperature, and during a second notch setting higher than the first notch setting, adjusting engine injection timing in a second proportion to the increasing temperature, the second proportion lower than the first proportion.

21 Claims, 4 Drawing Sheets

METHOD AND SYSTEM FOR ENGINE EMISSION CONTROL

TECHNICAL FIELD

The subject matter disclosed herein relates to methods and systems for controlling exhaust emissions from a combustion engine by adjusting injection timing in a vehicle, such as a rail vehicle.

DISCUSSION OF ART

Engine control systems may perform emissions control by adjusting engine injection timings responsive to a manifold air temperature (MAT). For example, the injection timing may be retarded as the manifold air temperature increases to reduce engine exhaust NOx emissions. Additionally, stringent government regulations require duty cycle exhaust emissions, such as NOx emissions, to be maintained. However, injection timing adjustments that enable emissions compliance can result in less-than-optimum engine performance, in particular at higher notches. As such, it may be desirable to have a method or system for emissions control that differs from those methods and systems that are currently available.

BRIEF DESCRIPTION

Methods and systems are provided for operating a combustion engine with a plurality of notch settings to dynamically adjust exhaust emissions in a notch-specific manner, based on ambient temperature conditions. In one embodiment, the method includes during a first notch setting, adjusting engine injection timing in a first proportion to an increasing temperature, and during a second notch setting higher than the first notch setting, adjusting engine injection timing in a second proportion to the increasing temperature, the second proportion lower than the first proportion. In this way, it is possible to offset increased emissions at higher notches via reduced emissions at lower notches. Therefore, increased power may be available at the higher notch setting, while still meeting an overall emission threshold for a given notch duty cycle.

In one example, a manifold air temperature of a rail vehicle engine, such as a locomotive engine, may be estimated by a temperature sensor included in the engine. Alternatively, the manifold air temperature may be inferred from an ambient temperature. In response to an increase in manifold air temperature (or ambient temperature, for example), an engine controller may be configured to retard an engine injection timing. As such, by retarding injection timing, NOx formation may be reduced, thereby reducing exhaust NOx emissions. The injection timing retard at different steady-state engine speed and load settings (such as notches in a rail embodiment), may be varied differently. Specifically, an amount of retard, including a threshold timing up to which the engine injection timing is retarded, may be adjusted based on the notch of the rail vehicle, such that the total exhaust emissions over the duty cycle of all the notches is kept within a threshold. For example, at higher notches, such as notch 8, injection timing may be retarded up to an earlier (that is, less retarded) threshold timing. In comparison, at lower notches, such as notch 3, injection timing may be retarded up to a later (that is, more retarded) threshold timing. The higher amount of retard used at the lower notches enables a greater reduction in NOx emission that compensates for the higher NOx emission at the higher notches due to the lower amount of retard. In this way, by tailoring the degree of retard in response to increase air temperature specific to the current notch setting, engine performance degradation due to injection timing retard at higher notches may be reduced while still meeting emission requirements.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Reference is now made briefly to the accompanying drawings, in which.

Like reference characters designate identical or corresponding components and units throughout the several views, which are not to scale unless otherwise indicated.

DETAILED DESCRIPTION

Figure 1:
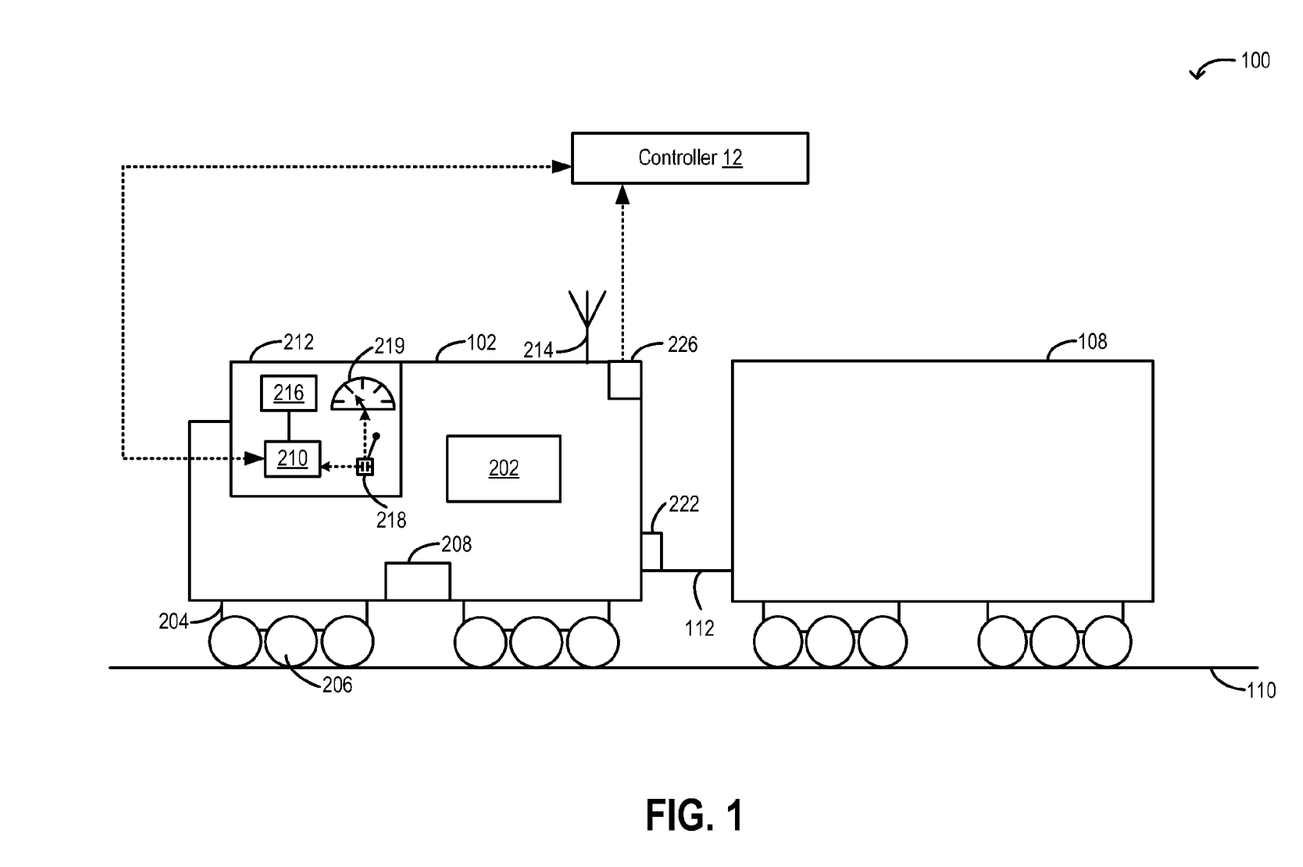
FIG. 1 shows an example embodiment of a rail vehicle system.
Figure 2:
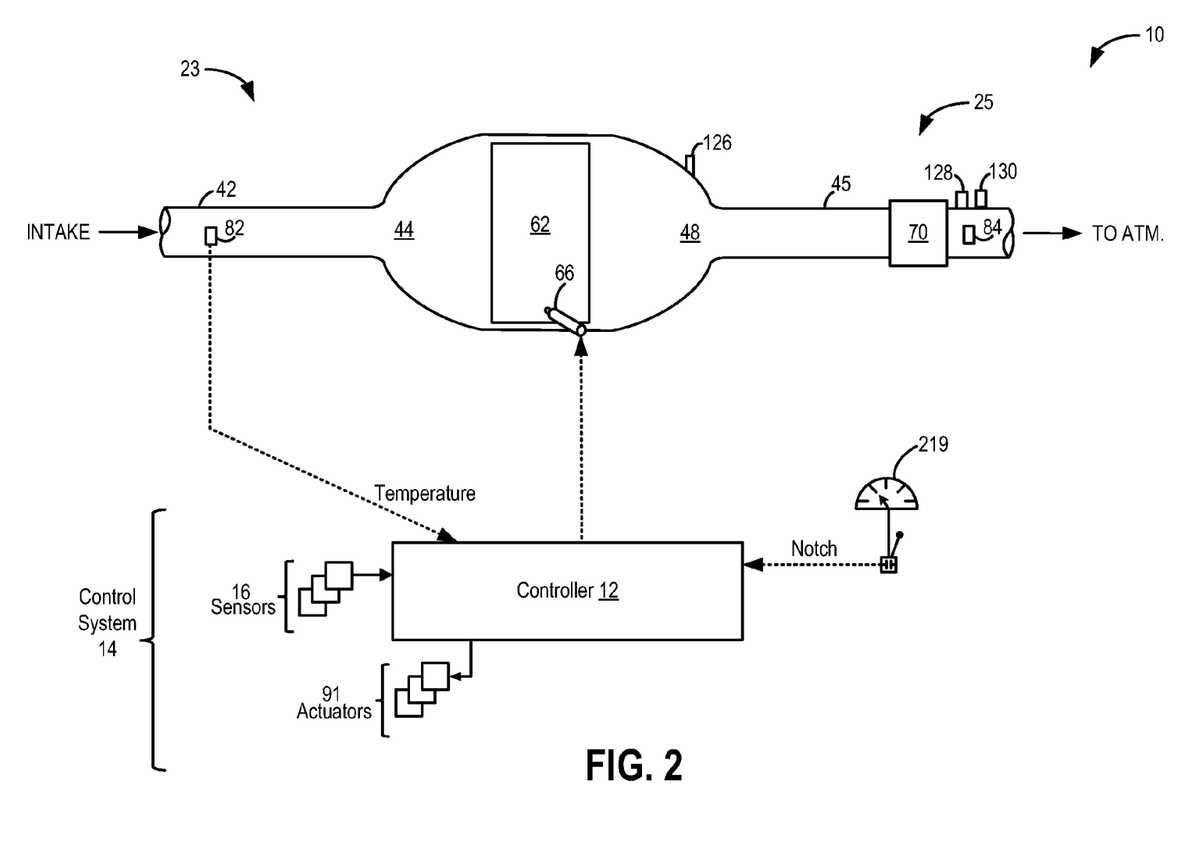
FIG. 2 shows an example engine system that may be configured in the rail vehicle system of FIG. 1.
Figure 3:
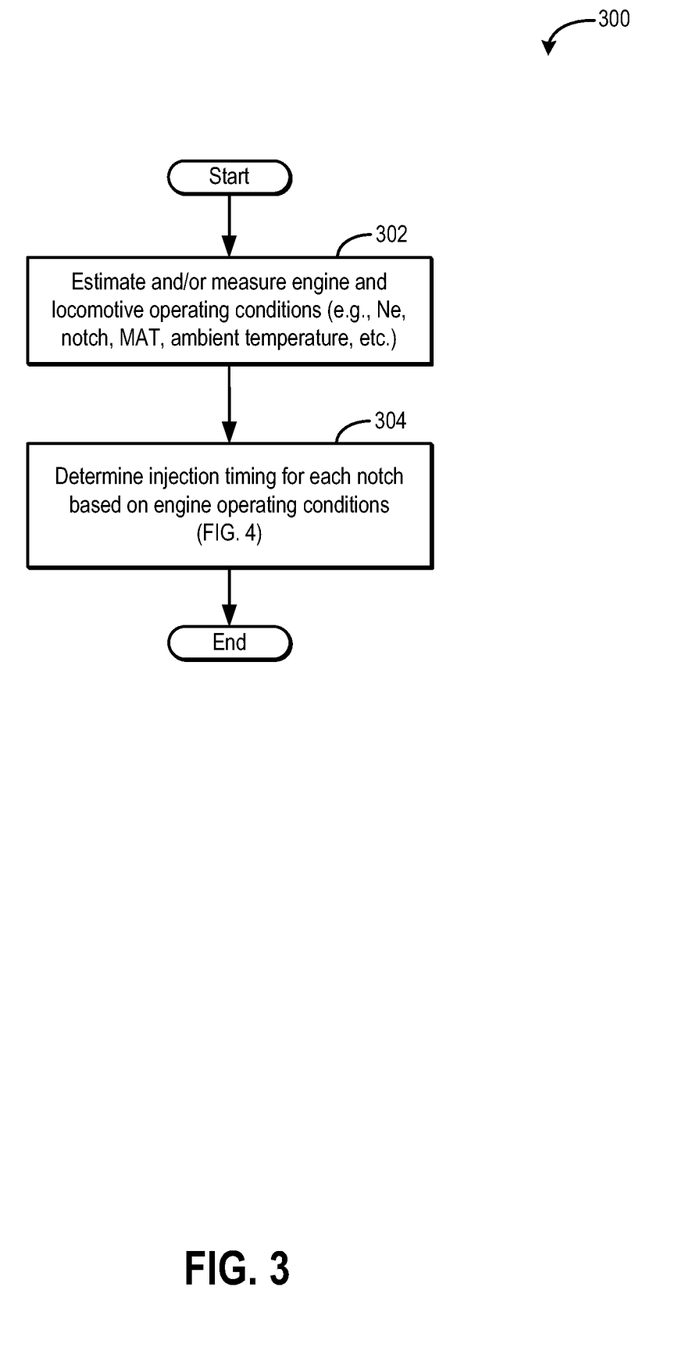
FIG. 3 shows a high level flow chart of a method for retarding engine injection timing in a notch-specific manner responsive to an increase in ambient temperature.
Figure 4:
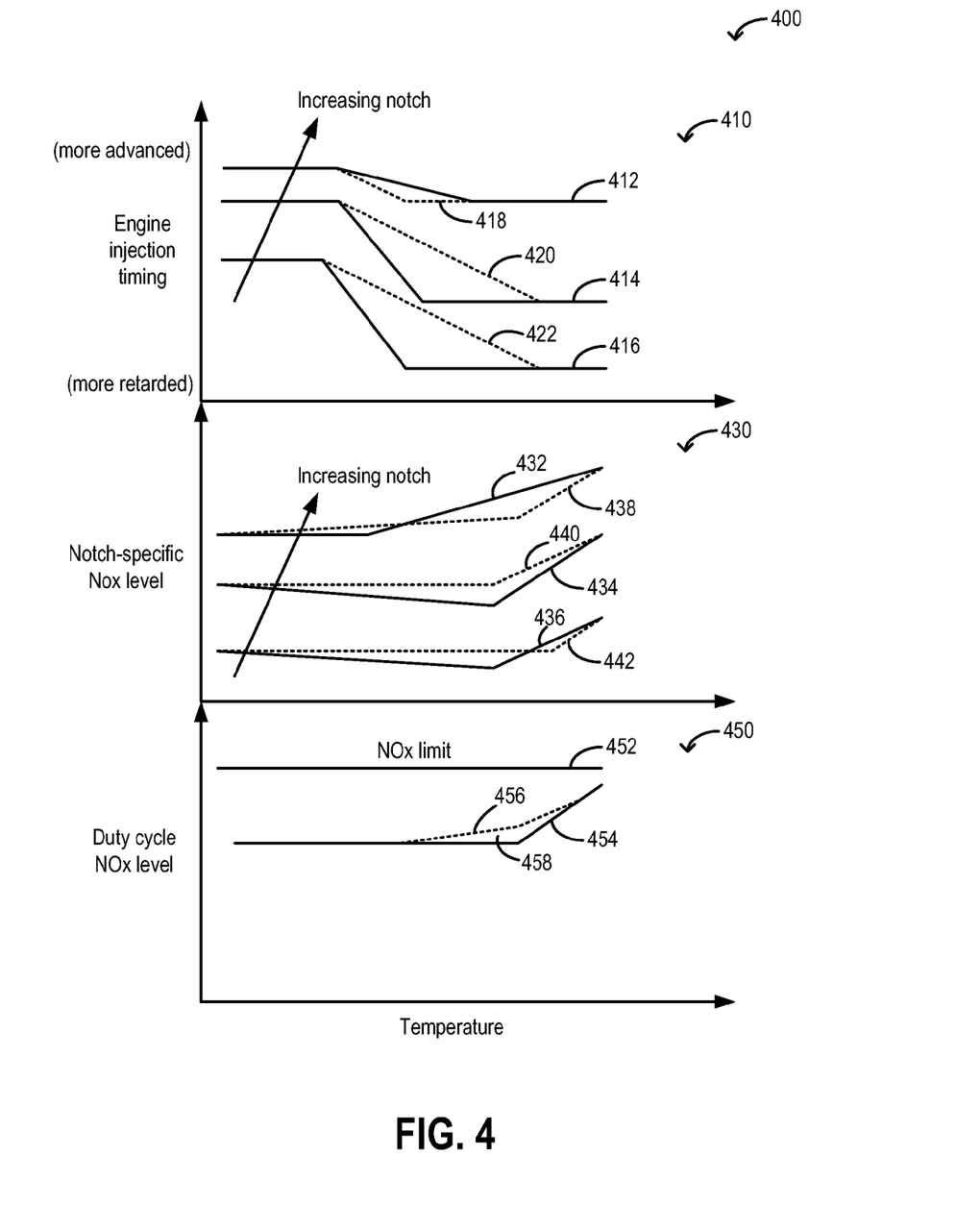
FIG. 4 shows example adjustments to engine injection timing retard at different notches to maintain a duty cycle NOx level within a limit.

An engine injection timing for a combustion engine (as shown in FIG. 2) in a vehicle, such as the rail vehicle system of FIG. 1, may be retarded in response to an increase in manifold temperature to reduce engine exhaust emissions, such as, exhaust NOx levels. An appropriately configured engine controller, which may be software, hardware, firmware or a combination thereof, may adjust the amount of retard, as well as the adaptation of the retard, in a notch-specific manner, as shown in FIG. 3. Specifically, by enabling a smaller and slower injection timing retard at higher steady-state engine speed and load settings (e.g., notches), and a larger and faster injection timing retard at lower steady-state engine speed and load settings, engine performance, particularly at higher steady-state engine speed and load settings, may be improved, while duty cycle emissions compliance (such as, for NOx emissions) is achieved. As shown in FIG. 4, by performing the adjustments in a notch-specific manner, a margin for NOx compliance may be improved, enabling further engine performance improvements.

FIG. 1 depicts an example embodiment of a vehicle system 100. In the depicted embodiment, vehicle system 100 is a train including a rail vehicle, such as locomotive 102, coupled to a trailing car 108 through a coupler 112. In alternate embodiments, locomotive 102 may be a lead locomotive consist coupled to one or more trailing cars. Locomotive engine 202 generates a torque that is used by a system alternator (not shown) to generate electricity for subsequent propagation of locomotive 102 along track 110. Traction motors (not shown), mounted on a truck 204 below the locomotive 102, provide tractive power for propulsion. In one example, as depicted herein, six inverter-traction motor pairs may be provided for each of six axle-wheel pairs 206 of locomotive 102. The traction motors may also be configured to act as generators providing dynamic braking to brake locomotive 102. In particular, during dynamic braking, each traction motor may provide torque in a direction that is opposite from the torque required to propel the locomotive in the rolling direction thereby generating electricity. At least a portion of the generated electrical power may be routed to a system electrical energy storage device, such as a battery (not shown). Air brakes 208 making use of compressed air may also be used by locomotive 102 for braking.

Locomotive operating crew and electronic components involved in locomotive systems control and management, such as an on-board diagnostics (OBD) system 210, may be housed within locomotive cab 212. OBD system 210 may be in communication with a controller 12, for example through wireless communication 214. Operating crew may input instructions, preferences, predefined operational limits, overriding details, etc. specific to a planned trip while on-board via OBD system 210 and connected display 216. Similarly, trip details generated by controller 12 may be displayed to the operating crew via display 216. As elaborated in FIGS. 2-3, one or more of OBD system 210 and controller 12 may include computer readable storage medium with code therein, the code carrying instructions for adjusting an engine injection timing in response to a change in engine manifold temperature.

A vehicle operator may control the power output of locomotive 102 (thereby also controlling locomotive speed) by adjusting locomotive throttle 218 and/or brake settings. Locomotive 102 may be configured with a stepped or "notched" throttle 218 with multiple throttle positions or notch settings 219. As such, each notch setting may represent a distinct steady-state engine speed and load setting for the vehicle. In one example, throttle 218 may have nine distinct notch settings 219, including one idle notch corresponding to an idle engine operation and eight power notches corresponding to varying degrees of powered engine operation, and continuous dynamic braking notches from setup to brake 8. Additionally, an emergency air brake application corresponding to an emergency stop position may also be included. When in the idle notch position, locomotive engine 202 may receive a minimal amount of fuel enabling it to idle at low RPM. Additionally, the traction motors may not be energized. That is, the locomotive may be in a "neutral" state. To commence operation of the locomotive, the operator may select a direction of travel by adjusting the position of a reverser (not shown). As such, the reverser may be placed in a forward, reverse, or neutral position. Upon placing the reverser in either a forward or reverse direction, the operator may release brake 208 and move the throttle 218 to the first power notch setting to energize the traction motors. As the throttle 218 is moved to higher powered notch settings, the fuel rate to engine 202 is increased, resulting in a corresponding increase in the power output from the engine and an increase in locomotive speed.

Locomotive 102 may include various sensors for determining locomotive operating conditions and communicating the same with OBD system 210 and/or controller 12. The various sensors may include track sensors configured to provide information regarding track 110. The information may include track grade, elevation, curvature, topography, speed limits, etc. Track information may be stored in a track database in controller 12. The track database may be used by controller 12 to estimate current and/or future positions of the locomotive consist. Coupler force sensor 222 may be configured to measure a force transmitted through coupler 112. As such, a tractive effort (TE) being hauled by locomotive 102 may also be inferred from the output of coupler force sensor 222. Location sensor 226 may determine a location of the locomotive, locomotive consist, or train. In one example, location sensor 226 may be a GPS sensor, communicating with a satellite through wireless communication 214. In alternate embodiments, location sensor 226 may include radio frequency automatic equipment identification (RF-AEI) tags, dispatch and/or video determination. In still another embodiment, the location of a locomotive may be determined based on the distance traveled from a reference point, for example, as estimated by a system tachometer. Information about travel locations may alternately be transferred from other trains. Wireless communication 214 may also be used to communicate between trains and/or with a remote location, such as a dispatch center. Further still, wireless communication 214 may be used to communicate between the different locomotives of a train.

As elaborated in FIGS. 2-3, controller 12 may be configured to adjust (e.g., retard) an engine injection timing at each of the plurality of notch settings 219 in response to a change (e.g., increase) in engine manifold temperature. By adjusting an injection timing retard in a notch-specific manner, increased power may be available at the higher notch settings, while still meeting an overall engine exhaust emission threshold for a given notch duty cycle.

Turning to FIG. 2, it depicts an example engine system 10 that may be operated in a vehicle system, such as locomotive 102 of vehicle system 100 (FIG. 1). In one example, engine 10 may be a diesel engine. However, in alternate embodiments, alternate engine configurations may be employed, such as a gasoline engine, a biodiesel engine, a natural gas engine, or a gas turbine engine (turbojet, turbofan, turboprop, turboshaft), for example. Furthermore, in alternate embodiments, engine 10 may be operated in other vehicle systems, such as an automotive, a marine vessel (e.g., ship), aircraft, railcar, etc.

Engine 10 has an intake 23 and an exhaust 25. Exhaust 25 has an exhaust manifold 48 leading to an exhaust passage 45 that routes exhaust gas to the atmosphere. One or more emission control devices 70 are coupled with the exhaust passage 45. The one or more emission control devices 70 address one or more substances that are present in the exhaust gas, which flows through the exhaust passage 45. Non-limiting examples of the one or more emission control devices are a three-way catalyst, lean NOx trap, oxidation catalyst, etc. Non-limiting examples of the monitored one or more substances that are present in the exhaust gas are NOx, $CO_2$, particulate matter (PMs), CO, etc.

Intake manifold 44 is configured to receive air charge, which is air from intake passage 42, to direct the air charge into a bank of cylinders 62. In some embodiments, engine 10 may further include a boosting device, such as a turbocharger or a supercharger, coupled between engine intake 23 and engine exhaust 25, for providing a boosted aircharge to the engine intake. An intercooler (not shown) can be included in intake manifold 44 to reduce the temperature of the boosted air charge supplied to the bank of cylinders 62. Fuel may be injected to bank of cylinders 62 by injector 66. In one example, each cylinder may include a dedicated injector. In another example, injectors may be provided in a bank-specific manner.

A temperature sensor 82 can be positioned in, or coupled to, intake manifold 44 (for example at intake passage 42), to provide an estimate of a manifold air temperature (MAT). Alternatively, temperature sensor 82 may be configured to estimate an ambient air temperature, and a controller may infer MAT based on the estimated ambient temperature. Based on the inferred and/or estimated MAT, controller 12 may be configured to adjust the injection timing of fuel injected into the bank of cylinders 62 by fuel injector 66. For example, controller 12 may receive an indication regarding a notch setting 219 of the locomotive throttle, and in response to an increase in temperature (manifold temperature and/or ambient temperature), controller 12 may retard engine injection timing at each of a plurality of notch settings 219 of the locomotive. Specifically, the controller may adjust an amount of engine injection timing retard in a notch-specific manner.

As elaborated with reference to FIGS. 3-4, by varying the engine injection timing for each notch in a notch-specific manner, elevated emissions at higher notches may be offset by reduced emissions at lower notches, such that high engine performance is maintained at the higher notch settings while time-in-notch duty cycle emissions are also kept within a threshold (such as a government regulated threshold). In one example, in response to an increase in ambient temperature or MAT, engine injection timing may be adjusted, e.g., retarded, at each of a plurality of notch settings. Specifically, during a first (lower) notch setting, the engine injection timing may be adjusted in a first proportion to the increasing temperature. In comparison, during a second notch setting, higher than the first notch setting, the engine injection timing may be adjusted in a second proportion to the increasing temperature, wherein the second proportion is lower than the first proportion. The differing proportions may reflect different amounts of injection timing retard, and/or different adaptations (or rates) of the injection timing retard. For example, the adjustment during the first notch setting may include retarding the engine injection timing by the first, larger, proportion (e.g., by a first, larger amount of retard for a given temperature increase), while the adjustment during the second, higher notch setting may include retarding the engine injection timing by the second, lower, proportion (e.g., by a second, smaller amount of retard for the given temperature increase). In another example, the adjustment during the first notch setting may include retarding the engine injection timing over a first, larger, temperature range, while the adjustment during the second notch setting may include retarding the engine injection timing over a second, smaller, temperature range.

As used herein, adjusting an engine injection timing (e.g., fuel injector injection timing) may include adjusting one or more of an injection start timing, an injection end timing, and an injection average timing. For example, an injector may have an opening timing, an opening duration, and a closing timing. The opening duration, among other parameters such as injection pressure, may be adjusted to control the amount of fuel injection. However, even while maintaining the amount of fuel injection at the same desired level, the timing of when, in relation to piston motion or the combustion cycle, the fuel is delivered, may also be adjusted. As noted above, the amount of fuel delivered may be maintained, yet the timing relative to the piston motion may be delayed (retarded), or advanced, by delaying (or advancing) both the opening and closing of the injector opening. Further still, adjustment of engine injection timing may also include an adaptation rate for the change in injection timing. In one example, the adaptation rate may be based on a duration over which the injection timing is adjusted. In another example, the adaptation rate may be based on a temperature range over which the injection timing is adjusted.

An exhaust gas (NOx) sensor 128 may be included in exhaust passage 45, downstream of emission control device 70, to provide an estimate of exhaust NOx levels of the engine exhaust before entry into the atmosphere. In alternate embodiments, exhaust gas sensor 128 may provide an estimate of an alternate substance in the exhaust emissions, such as CO or $CO_2$. In still other embodiments, an estimate of the exhaust emissions NOx level may be inferred from engine operating conditions.

Engine 10 may be controlled at least partially by control system 14 including controller 12, and by input from a vehicle operator via an input device (not shown). Controller 12 is shown receiving information from a plurality of engine sensors 16 (various examples of which are described herein) and sending control signals to a plurality of engine actuators 91 (various examples of which are described herein). As one example, engine sensors 16 may include exhaust gas sensor 126 (e.g., an exhaust $O_2$ sensor) located in, or coupled with, the exhaust manifold 48, exhaust temperature sensor 130 located downstream of emission control device 70, intake temperature sensor 82, exhaust NOx sensor 128, etc. Various other sensors such as additional pressure, temperature, air/fuel ratio and alternate regulated emissions sensors may be coupled to various locations in engine 10. As another example, engine actuators 91 may include fuel injector 66, and a throttle, if equipped. Other actuators, such as a variety of additional valves, may be coupled to various locations in engine 10.

In a rail embodiment, such as where engine 10 is operated in a locomotive, controller 12 may be coupled to the engine of the same locomotive, or may be remotely located, for example, at a dispatch center. Herein, controller 12 may also receive information from a plurality of locomotive sensors and may send control signals to a plurality of locomotive actuators. Example locomotive sensors may include locomotive position sensors (e.g., GPS device), environmental condition sensors (e.g., for sensing altitude, ambient humidity, temperature, and/or barometric pressure, or the like), locomotive coupler force sensors, track grade sensors, locomotive notch sensors, brake position sensors, etc. Various other sensors may be coupled to various locations in the locomotive. Example locomotive actuators may include a locomotive throttle notch, air brakes, brake air compressor, traction motors, etc. Other actuators may be coupled to various locations in the locomotive. Controller 12 may receive input data from the various engine and locomotive sensors, process the input data, and trigger the engine and locomotive actuators in response to the processed input data based on instruction or code programmed therein corresponding to one or more routines. An example control routine is described herein with regard to FIG. 3.

Now turning to FIG. 3, an example routine 300 is described for adjusting an engine injection timing in response to changes in manifold temperature in a notch-specific manner. By adjusting the injection timing at each notch differently, engine performance may be improved while overall duty cycle emissions compliance is achieved.

At 302, the routine includes estimating and/or measuring engine operating conditions. In the case of a rail embodiment, wherein the engine is included in a locomotive, the routine may further include estimating and/or measuring locomotive operating conditions. Engine operating conditions estimated may include, for example, an engine speed, an engine oil temperature, manifold air temperature, ambient air temperature, engine coolant temperature, engine torque, AESS operations and their details, engine boost, etc. In one example, the manifold air temperature may be estimated by a dedicated temperature sensor coupled to the engine intake. In another example, wherein the ambient air temperature is estimated by a dedicated temperature sensor coupled to the engine intake, the manifold air temperature may be inferred from the ambient air temperature.

Locomotive operating conditions estimated may include, for example, a locomotive position, a locomotive configuration, coupler forces, tractive efforts (TE) and TE limits, mission details (e.g., starting point, ending point, starting time, ending time, number and position of stops), track details (e.g., grade, crest and/or sags, regions of undulation), weather details along the route, cargo details (e.g., nature of cargo, tonnage), etc.

At 304, based on the estimated engine and/or locomotive operating conditions, injection timing adjustments may be determined for each of the plurality of notches. In one example, the controller may have a look-up table including a plurality of calibration profiles for each of the plurality of notch settings stored in the memory. Thus, the controller may be configured to adjust the injection timing for a given notch setting based on the calibration profile of the selected notch setting. An example of notch-specific calibration profiles that may be used by the controller to make injection timing adjustments is illustrated herein with reference to FIG. 4.

In one example, adjusting the engine injection timing based on engine operating conditions may include retarding engine injection timing at each of a plurality of notch settings in response to an increase in temperature. The temperature may include, for example, an engine manifold temperature and/or an ambient temperature. Herein, the engine's injection timing may be retarded to reduce an amount of a regulated emission substance, such as NOx, that is present in the engine's exhaust. However, the change in injection timing may also affect engine performance and fuel economy, in particular at higher notch settings. Thus, to enable emissions compliance to be achieved without degrading engine performance, a degree of adaption (or gain) of the injection timing retard for a given temperature increase is decreased (that is, with lower gains) at higher notch settings while the degree of adaption of the injection timing retard for the given temperature increase is increased (that is, with higher gains) at lower notch settings. The decreased adaptation of injection timing retard at the higher notch settings allows engine performance and power output to be attained at the higher notch settings albeit with a smaller change in exhaust emissions. The notch-specific adaptations may include, for example, adapting the injection timing retard at the higher notch settings over a smaller temperature range while adapting the injection timing retard at the lower notch settings over a larger temperature range.

In one example, the decrease in the degree of adaptation at the higher notch settings may be further adjusted to be larger than the increase in the degree of adaptation at each of the lower notch settings, such that the smaller change in exhaust emissions (e.g., exhaust NOx levels) at the higher notch settings can be offset by the larger change in exhaust emissions (e.g., exhaust NOx levels) at the lower notch settings. For example, the decrease in the degree of adaptation at the highest notch setting may be approximately equal to a sum of the increases in the degree of adaptation at each of the lower notch settings. In another example, the adaptation rate may also be adjusted based on the ambient temperature. For example, for a given notch setting, the injection timing retard may be adapted at a higher rate at lower temperatures, and at a lower rate at higher temperatures.

In this way, by adjusting an amount of engine injection timing retard and an adaptation of the injection timing retard at each of a plurality of notch settings based on the temperature and the notch setting, a notch duty cycle exhaust NOx level is maintained within a threshold without degrading engine performance.

Turning now to FIG. 4, map 400 illustrates example adjustments to engine injection timing retard at different notch settings, and the consequent change in exhaust NOx levels. Specifically, graph 410 shows a plurality of calibration profiles (for engine injection timings at different temperatures) associated with a plurality of notch settings. The plurality of calibration profiles include a first set of calibration profiles depicting engine injection timings for different notch settings with notch-specific adjustments (solid line) and a second set of calibration profiles depicting engine injection timings for the different notch settings without notch-specific adjustments (dotted line). In one example, the details of the calibration profiles of graph 410 may be stored in a look-up table, and may be accessed by a controller when performing a routine to determine an engine injection timing in response to a temperature change (such as in the routine of FIG. 3) for a locomotive engine, the locomotive including a throttle with a plurality of notch settings. Graph 430 compares changes in notch-specific exhaust NOx levels at the engine injection timings with notch-specific adjustments (solid line) to those without the notch-specific adjustments (dotted line). Graph 450 compares changes in an overall notch duty cycle exhaust NOx level corresponding to the notch-specific adjustments (solid line) with those without the notch-specific adjustments (dotted line), in relation to a predefined NOx limit.

Turning to graph 410, lines 416, 414, and 412 (solid lines) illustrate calibration profiles of notch-specific engine injection timing adjustments responsive to an increase in temperature at progressively increasing notch settings. Specifically, line 412 shows a first calibration profile associated with the highest notch setting, line 414 shows a second calibration profile associated with a first lower notch setting, and line 416 shows a third calibration profile associated with a second lower notch setting, the second lower notch setting lower than the first lower notch setting.

In response to an increase in temperature (ambient or manifold temperature), a control system may adjust, for example, retard, an engine injection timing at each of a plurality of notch settings. As shown at lines 412, 414, and 416, an amount of engine injection timing retard at each of the plurality of notch settings may be based on the increase in temperature and the given notch setting such that an amount of retard for a given increase in temperature is less at the highest notch setting (line 412) than the amount of retard for the given increase in temperature at each of a plurality of lower notch settings (lines 414 and 416). Further, the injection timing may be adjusted over a smaller temperature range at the highest notch setting (line 412) than at each of the lower notch settings (lines 414 and 416).

Specifically, a first amount of retard for a given temperature increase during the highest notch setting may be determined based on the first calibration profile (line 412), a second amount of retard for the given temperature increase during the first lower notch setting may be determined based on the second calibration profile (line 414), a third amount of retard for the given temperature increase during the second lower notch setting may be determined based on the third calibration profile (line 416). Herein, the second amount of retard may be greater than the first amount of retard, the third amount of retard may also be greater than the first amount of retard. Furthermore, a sum of the second and third amount of retard may be adjusted to be less than or equal to the first amount of retard.

As a result of the notch-specific engine injection timing adjustments, a larger amount of NOx is emitted at the highest notch setting (line 432) while a smaller amount of NOx is emitted at each of the lower notch settings (lines 434, 436). In other words, the NOx reduction at each of the lower notch settings is larger than the NOx reduction at the highest notch setting. The lower amount of injection timing retard used at the higher notch setting allows engine performance to be maintained at the cost of higher NOx emissions (or lower reduction of NOx levels). The elevated NOx emissions of the highest notch setting are, in turn, compensated for by reduced NOx emissions at each of the lower notch settings (resulting from the higher amount of injection timing retard applied at each of the lower notch settings). In this way, by varying the injection timing retard used at each notch differently, a total amount of NOx emitted (line 454) over the notch duty cycle can be maintained within a predefined NOx limit 452, without degrading engine performance.

In comparison, if the injection timing of each notch setting is adjusted such that the amount of NOx emitted at any given notch setting is kept constant, the duty cycle NOx level can be maintained within the predefined NOx limit, however, the injection timing retard at the higher notch settings can degrade the engine's performance. For example, as shown by dotted lines 418, 420, 422 of graph 410, in response to an increase in temperature, the injection timing at each of a plurality of notch settings may be retarded with substantially equal degrees of adaptation (lines 418, 420, 422). As a result, as shown by dotted lines 438, 440, 442 of graph 430, a relatively larger amount of NOx may be generated at the lower notches while a relatively smaller amount of NOx may be generated at the higher notches. That is, there may be relatively larger NOx reduction at the higher notches and a relatively smaller NOx reduction at the lower notches (as compared to the profiles with the notch-specific adjustments). The resultant duty cycle NOx level (line 456) may be kept within the predefined NOx limit 452. However, the engine injection timing adjustment enabling maintenance of NOx emission levels at the higher notch settings at constant levels results in a penalty in engine performance and fuel economy.

It will be appreciated that while the above example illustrates adjustment of engine injection timing to enable management of exhaust NOx levels, in alternate embodiments, the same may be applied towards the management of other exhaust emissions, such as $CO_2$, CO, particulate matter (PM), etc. It will also be appreciated that while the above example illustrates adjustment of engine injection timing based on a notch setting, in alternate embodiments, such as where the vehicle is not a rail vehicle, the engine injection timing of the vehicle may be adjusted based on discrete steady-state engine speed and load settings.

Thus, by using a notch-specific adjustment wherein the injection timing of each notch setting is adjusted differently and independently, a larger margin 458 for emissions compliance can be achieved. As one example, by providing a larger margin for emissions compliance, the flexibility in developing an engine recipe may be improved. In one example, the injection timing of one or more notch settings may be further adjusted to further improve engine fuel economy while still maintaining duty cycle emissions within the limit. This may include, for example, advancing the engine injection timing at some or all of the notch settings, or retarding the injection timing at some or all of the notch settings by a smaller amount. In another example, an alternate engine operating parameter (e.g., boost, valve timing, EGR, etc.) may be adjusted to improve fuel economy while still maintaining duty cycle emissions within the limit. Furthermore, by improving the emissions margin, sudden surges in emissions can be better addressed.

In one example, a controller may select between the different sets of calibration profiles depicted in FIG. 4 based on operating conditions. For example, during a first condition, in response to an increase in temperature, the controller may maintain a constant duty cycle NOx by adjusting the engine injection timing retard at each of the plurality of notch settings to maintain a constant NOx emission at each of the plurality of notch settings. During a second condition, in response to the increase in temperature, the controller may maintain a constant duty cycle NOx by adjusting an injection timing retard at each of the plurality of notch settings differently, in a notch-specific manner, to vary a NOx emission at each of the plurality of notch settings.

In this way, by varying the adaptive timing curve for each notch setting different from that of the other notch settings, at varying ambient temperatures, duty cycle emissions compliance may be achieved without degrading engine reliability, fuel economy, or engine performance.

Unless otherwise specified (such as in the claims), embodiments of the invention are applicable to vehicles generally, and/or to vehicles with diesel engines. Thus, any instances of "locomotive" herein refer more generally to a vehicle, unless otherwise specified.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims. Moreover, unless specifically stated otherwise, any use of the terms first, second, etc., do not denote any order or importance, but rather the terms first, second, etc. are used to distinguish one element from another.

The invention claimed is:

1. A method of operating an engine having a plurality of steady-state engine speed and load settings, comprising,
   during a first steady-state engine speed and load setting, adjusting engine injection timing in a first proportion to an increasing temperature; and
   during a second steady-state engine speed and load setting higher than the first steady-state engine speed and load setting, adjusting engine injection timing in a second proportion to the increasing temperature, the second proportion lower than the first proportion, wherein adjusting engine injection timing in a first proportion includes retarding engine injection timing by a first, larger, amount, for a given temperature increase, and wherein adjusting engine injection timing in a second proportion includes retarding engine injection timing by a second, smaller, amount for the same given temperature increase.

2. The method of claim 1, further comprising,
   estimating a manifold air temperature; and
   adjusting the engine injection timing based on the estimated manifold air temperature.

3. The method of claim 2, wherein estimating the manifold air temperature includes measuring a temperature of an engine intake via a temperature sensor coupled to the engine intake.

4. The method of claim 1, further comprising, measuring an ambient air temperature.

5. The method of claim 1, wherein retarding engine injection timing includes retarding one or more of an injection start timing, an injection end timing, and an injection average timing.

6. The method of claim 5, wherein during the first steady-state engine speed and load setting, engine injection timing is retarded over a first, larger, temperature range, and during the second steady-state engine speed and load setting, engine injection timing is retarded over a second, smaller, temperature range.

7. The method of claim 1, wherein the engine is operated in a vehicle, the vehicle including a locomotive.

8. The method of claim 1, wherein the engine is operated in a vehicle, the vehicle including one of a marine vessel, an automotive, a railcar, and an aircraft.

9. The method of claim 8, wherein the vehicle is a railcar, and wherein the first and second steady-state engine speed and load settings are a first and a second notch setting.

10. A method of operating a locomotive engine including a plurality of notch settings, comprising,
retarding engine injection timing at each of the plurality of notch settings in response to an increase in temperature, wherein a proportion of the injection timing retard for a given temperature increase is decreased at a higher notch setting, and wherein the proportion of the injection timing retard for the given temperature increase is increased at a lower notch setting.

11. The method of claim 10, wherein the decrease in the proportion at the higher notch setting is larger than the increase in the proportion at the lower notch setting.

12. The method of claim 11, wherein the proportion of the injection timing retard for the given temperature increase is increased for a plurality of notch settings lower than the higher notch setting, and where the decrease in the proportion at the higher notch settings is larger than the increase in the proportion at each of the lower notch settings, but approximately equal to a sum of the increases in the proportion at each of the lower notch settings.

13. The method of claim 11, wherein the injection timing retard at the higher notch setting extends over a smaller temperature range while the injection timing retard at the lower notch setting extends over a larger temperature range.

14. The method of claim 10, wherein an amount of engine injection timing retard at each of the plurality of notch settings is based on the temperature and the notch setting.

15. The method of claim 10, wherein the temperature includes one of a manifold temperature and an ambient temperature.

16. A system, comprising,
a control system having computer readable storage medium with code therein, the code carrying instructions for:
retarding an engine injection timing at each of a plurality of discrete throttle settings in response to a given increase in temperature, wherein an amount of injection timing retard for the given increase in temperature is lower at a highest throttle setting than the respective amounts of injection timing retard for the given increase in temperature at each of a plurality of lower throttle settings.

17. The system of claim 16, wherein the injection timing is adjusted over a smaller temperature range at the highest throttle setting than each of the plurality of lower throttle settings.

18. The system of claim 16, wherein the code further includes a first calibration profile associated with the highest throttle setting, a second calibration profile associated with a first lower throttle setting, and a third calibration profile associated with a second lower throttle setting, the second lower throttle setting lower than the first lower throttle setting, the code further carrying instructions for determining a first amount of retard for a given temperature increase during the highest throttle setting based on the first calibration profile, determining a second amount of retard for the given temperature increase during the first lower throttle setting based on the second calibration profile, the second amount of retard greater than the first amount of retard, and determining a third amount of retard for the given temperature increase during the second lower throttle setting based on the third calibration profile, the third amount of retard greater than the first amount of retard.

19. The system of claim 16 further comprising an engine including an intake, and a temperature sensor in the engine intake, wherein the control system further includes code carrying instructions for measuring a manifold air temperature in the engine intake, and adjusting the amount of engine injection timing retard based on an increase in the measured manifold air temperature.

20. The system of claim 19, further comprising an injector for injecting fuel into the engine.

21. The system of claim 20, wherein the engine is a locomotive engine including a throttle with the plurality of discrete throttle settings.

* * * * *